United States Patent [19]
Savakis et al.

[11] Patent Number: 6,035,058
[45] Date of Patent: Mar. 7, 2000

[54] AUTOMATIC COLOR DROPOUT USING LUMINANCE-CHROMINANCE SPACE PROCESSING

[75] Inventors: Andreas E. Savakis; James M. Madigan, both of Rochester, N.Y.

[73] Assignee: Eastman Kodak Company, Rochester, N.Y.

[21] Appl. No.: 09/021,161

[22] Filed: Feb. 10, 1998

[51] Int. Cl.[7] .................................................. G06K 9/00
[52] U.S. Cl. .......................................................... 382/163
[58] Field of Search ................................... 382/163, 165, 382/164, 167; 358/517, 520

[56] References Cited

U.S. PATENT DOCUMENTS

| | | |
|---|---|---|
| 4,727,425 | 2/1988 | Mayne et al. . |
| 5,010,580 | 4/1991 | Vincent et al. .......................... 382/163 |
| 5,014,328 | 5/1991 | Rudak . |
| 5,014,329 | 5/1991 | Rudak . |
| 5,335,292 | 8/1994 | Lovelady et al. ....................... 382/163 |
| 5,621,816 | 4/1997 | Ruppert .................................. 382/163 |
| 5,664,031 | 9/1997 | Murai et al. . |

*Primary Examiner*—Phuoc Tran
*Attorney, Agent, or Firm*—Nelson Adrian Blish

[57] ABSTRACT

A document (10) is scanned to provide a digital image. At least one non-dropout color is selected (32) and transformed to a Luminance-Chrominance space (34). Each pixel of the scanned image is converted to the Luminance-Chrominance space (36) and the distance of each of the image pixels from the non-dropout color is determined (38). Each of the image pixels is converted to black (44) if the distance from the non-dropout color is less than or equal to a threshold value, and converted to white (42) if the distance is greater than the threshold value. The converted black and white pixels are then stored.

12 Claims, 4 Drawing Sheets

PRIMARY *

X                              X
■         LEONARD    W   09 29 ■    X    ■              LEONARD    W
■    BLVD                   X
SHREVEPORT         LA
71118      318  686-■

X         09 29 ■      X
                                    X
                                    X

SIGNATURE ON FILE                    SIGNATURE ON FILE

X 466.0
461.9

2/25/92      O      99212      1 2    -24.00 001

72-■        X   ■00000■  X         24.00    0.00   24.00
                                   ■■■■■■■■■■■, M. D.
                                   FAMILY PRACTICE
■■■■■■■■■■■■■■■■■■■■              P. O. BOX ■
     2/26/92                       SHREVEPORT, LA ■
                                   318-221-■

FIG. 2

AUTOMATIC COLOR DROPOUT USING LUMINANCE-CHROMINANCE SPACE PROCESSING

FIELD OF INVENTION

The present invention relates to the field of digital image processing and more particularly to the area of automatic color dropout using Luminance-Chrominance space processing.

BACKGROUND OF THE INVENTION

In document image processing there is a need to extract textual information from an image that has color content in the background. The removal of the color content is useful in specific applications, such as forms processing, where the color content on the form, used to facilitate data entry, adds no value to subsequent data processing. Color dropout reduces the image file size, eliminates extraneous information, and simplifies the task of extracting textual information from the image for the reader or processing system.

An example of an application where color dropout is important is in the field of optical character recognition (OCR). In the OCR process, a document 10, an example of which is shown in FIG. 1, is scanned electronically, converting all the information to a digital image. Once the data is captured in electronic form, the information to be read is separated from the background information, such as boxes and text with instructions on how to complete the form. This process results in the elimination of all but essential information, as shown in FIG. 2. Once this separation is accomplished, the text fields of the image are extracted and processed by an OCR algorithm.

A scanning system capable of capturing an image in color produces a digital image file with three color components. The number of pixels in the color image depends on the resolution of dots per inch resolved by the camera optics and detector. The numerical value at each pixel of a color component represents the amount of the particular primary color detected at that pixel. In cases where all three color components have the same value, the resultant image is said to be a shade of gray. As the intensity of each color component is reduced, the gray appearance turns black.

Business forms are typically printed with some background color, for example, a pastel color. One way of eliminating this background color is to use an optical filter in the electronic scanner, matched to the background color to be eliminated. The color filter prevents the scanner detector from discerning information printed in color, therefore, the pastel background appears white to the scanner. The text printed in black or other dark color is captured by the scanner. This system works, but limits the dropout colors to the filter installed on the scanner which must match the background color on the forms. Thus, different color forms require different filters.

In one color dropout system currently available, codes are stored in a lookup table for dropout of cyan, magenta, or yellow (CMY). See U.S. Pat. No. 4,727,425. Another method of determining dropout colors is disclosed in U.S. Pat. Nos. 5,014,328 and 5,014,329, wherein the dropout color is selected as an average color of a calibration zone or patch of the document to be scanned. The coefficients of a color filter are selected to tune-out the red, green, blue (RGB) of the dropout color. Another approach is disclosed in U.S. Pat. No. 5,664,031, wherein a blank form is scanned and all the RGB color information is stored in memory. The stored blank form is then digitally compared with the completed form for the purpose of color dropout.

A system that automatically identifies the color of the desired textual information and eliminates all other colors is desirable.

SUMMARY OF INVENTION

The present invention is directed to overcoming one or more of the problems set forth above. Briefly summarized, according to one aspect of the present invention a document is scanned to provide a digital image. At least one non-dropout color is selected and transformed to a Luminance-Chrominance space. Each pixel of the scanned image is converted to the Luminance-Chrominance space and the distance of each of the image pixels from the non-dropout color is determined. Each of the image pixels is converted to black if the distance from the non-dropout color is less than or equal to a threshold value, and converted to white if the distance is greater than the threshold value. The converted black and white pixels are then stored.

The invention automatically identifies color content within an image and categorizes each pixel of the image into two classes, the pixels that are to be retained and those that are to be eliminated. In the preferred embodiment, the image pixels are converted into a Luminance-Chrominance color space, such as, for example, YCbCr, Lab, or Yuv. Each converted pixel is evaluated against a threshold value, which allows for color tolerances due to printing, stability, and other variations. As each image pixel is evaluated, a determination is made to retain or eliminate that pixel from the output image. The pixels which are retained are converted to black, and the pixels that are eliminated are converted to white. Thus, a single bit per pixel is sufficient for describing the image data content The comparisons may also be done in the RGB space.

The present invention varies from the prior art in several respects. No pre-scan of a blank document or any portion of a document is needed to determine the dropout colors. Filtering is not based on dropout colors to be erased, but rather on non-dropout colors which determine what colors are retained. Non-dropout colors are based on typical ink colors, such as black and dark blue. In the preferred embodiment, color filtering is not done in RGB space, but it is done in a Luminance-Chrominance color space, such as YCbCr, which is more uniform than RGB.

There are numerous advantages of the present invention including, but not limited to: an operator is not required to set parameters for each image or image type; color removal is performed by evaluating local image content without access to the entire image; less memory is required than for other techniques; the process does not require buffering the entire image; the invention reduces the information extraction process time; improves image transmission time; and the color or colors retained represent the aspects of significant interest to the end user.

The above, and other objects, advantages and novel features of the present invention will become more apparent from the accompanying detailed description thereof when considered in conjunction with the following drawings.

BRIEF DESCRIPTION OF THE DRAWINGS

Figure 1:
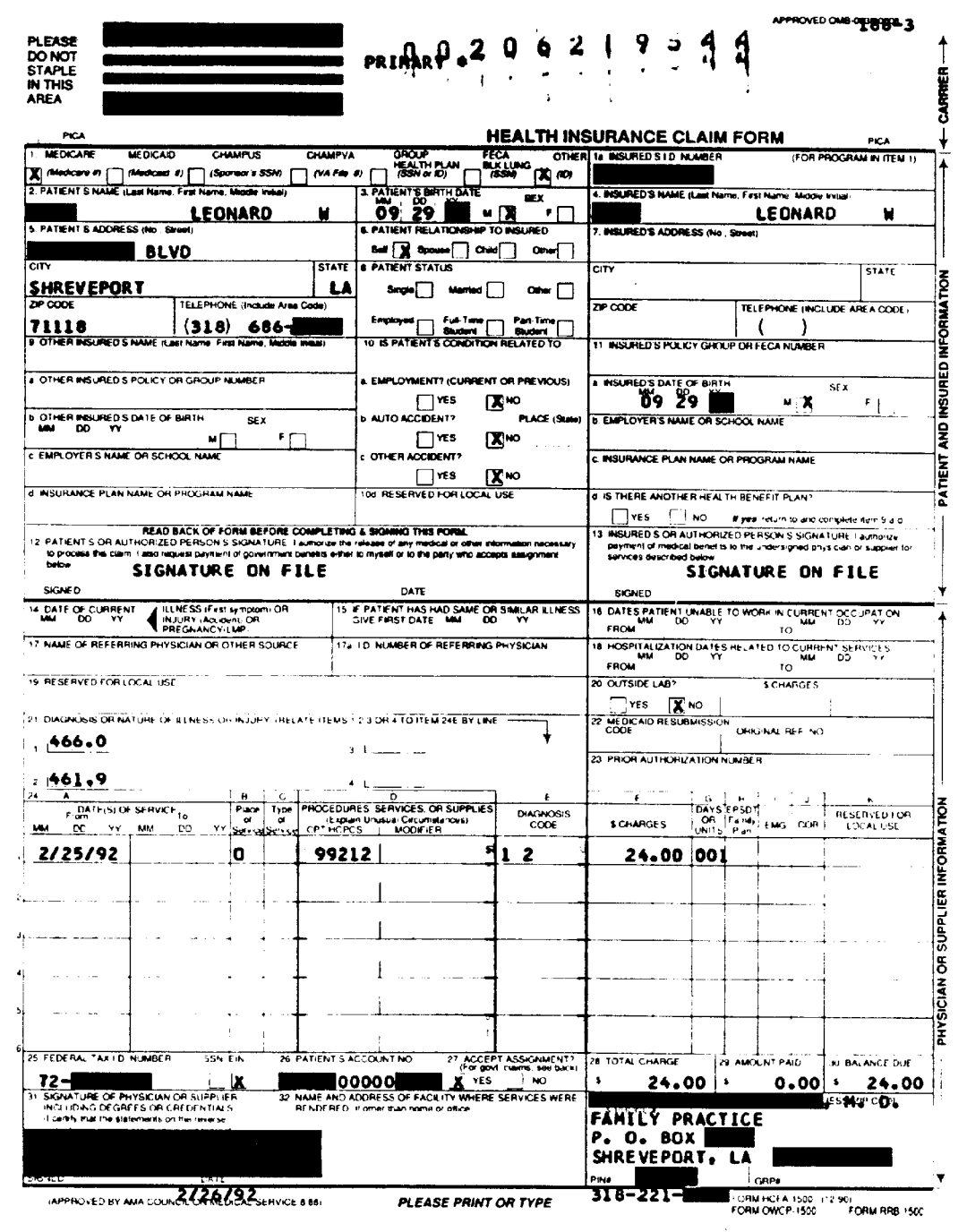

FIG. 1 is a business form with background colors;

FIG. 2 is the business form shown in FIG. 1 after color dropout;

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

Figure 3:
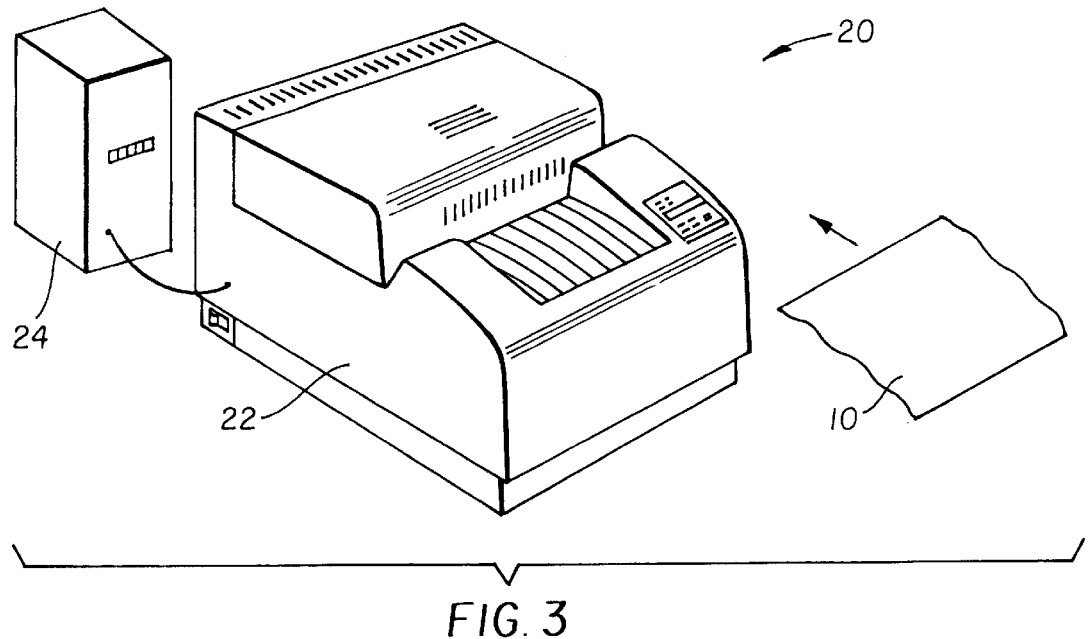
FIG. 3 is a perspective view of a document scanner.

FIG. 3 shows a document imaging system 20 comprised of a scanner 22. Scanner 22 is shown as an automatic feed scanner, however, other types of scanners such as flatbed scanners are suitable in the practice of this invention. A document 10 is scanned by scanner 22 and the information on document 10 is converted to a digital image by scanner 22 and is transferred to a computer 24 for processing.

Figure 4:
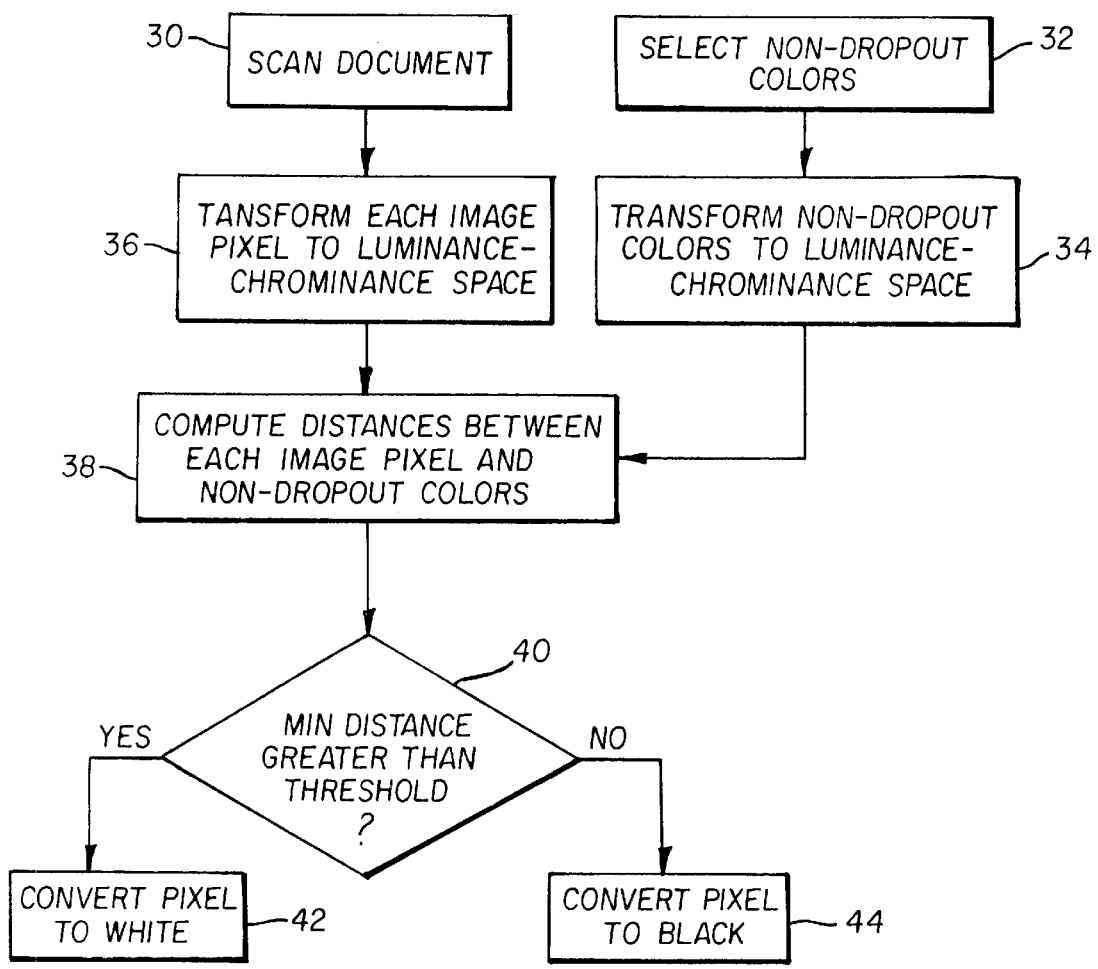
FIG. 4 is a flow chart according to one aspect of the present invention.

Referring to FIG. 4, a flow chart illustrates one aspect of the present invention. The document scanning step is shown at block 30. A non-dropout color is selected at block 32. For example, black which is a typical color ink used to complete forms, is the non-dropout color most frequently selected. The non-dropout color is transformed to a Luminance-Chrominance space at block 34.

Each scanned image pixel is transformed to the Luminance-Chrominance space at block 36. Typically, the scanner 22 color output is in red, green, blue (RGB) form. It is possible to describe the colors to be retained in the RGB space with some tolerance around each color specified. However, processing in RGB space is not preferred, because the RGB space is not uniform with respect to color. Transforming the image to a Luminance-Chrominance space via a color transformation is desirable because several Luminance-Chrominance spaces are designed to be nearly uniform.

Although the RGB color space is the most widely used, it is device dependent and color differences are not perceptually the same throughout the space. It is possible to transform the RGB values to a device independent CIE xyz color space, but xyz is not perceptually uniform either. Better results can be obtained by using one of the Luminance-Chrominance color spaces, such as CIELUV, CIELAB, or YCbCr. In the preferred embodiment, the YCbCr color space is used, which consists of Luminance Y, Blue Chrominance Cb, and Red Chrominance Cr. The transformation from RGB to YCbCr involves a matrix multiplication:

$Y = 0.257R + 0.504G + 0.098B + 16$ $Cb = -0.148R - 0.291G + 0.439B + 128$ $Cr = 0.439R - 0.368G - 0.071B + 128$

The RGB variables take values in (0–255) and the resulting ranges are (16–235) for Y, and (16–240) for Cb and Cr. The transformation from YcbCr to RGB is obtained as follows:

$R = 1.164(Y-16) + 1.596(Cr-128)$ $G = 1.164(Y-16) - 0.813(Cr-128) - 0.392(Cb-128)$ $B = 1.164(Y-16) + 2.017(Cb-128)$

Figure 5:
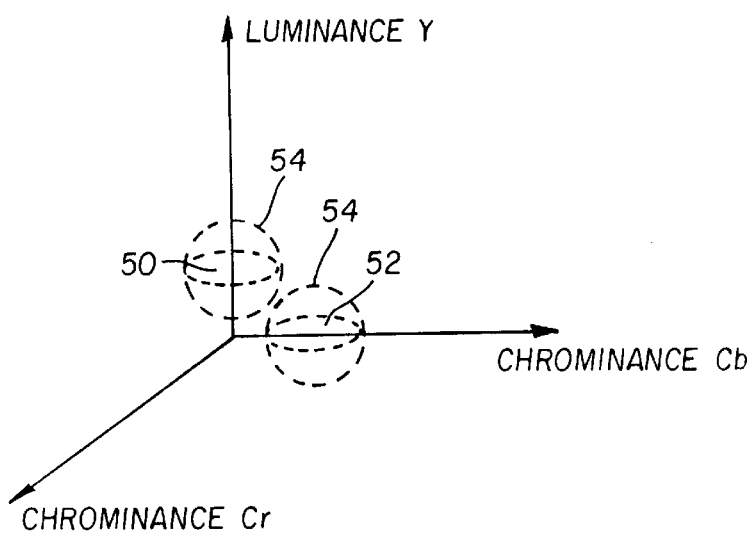
FIG. 5 is a schematic view of non-dropout colors in a Luminance-Chrominance space.

In the working space in this embodiment, in the Luminance-Chrominance space, each color component of the image pixel is allowed a variation for ink choice, printing variation, dye stability, and noise due to paper texture. A threshold value, shown as a radial distance in FIG. 5, is chosen to determine the space containing the non-dropout color or colors. A determination is made by comparing each individual image pixel to the threshold value at block 40, and if a distance to each pixel is greater than the threshold value, the pixel is converted to white at block 42. If the distance to each pixel is less than the threshold value, the pixel is converted to black at block 44.

The processing was done in YCbCr space, where the black color was retained while all other colors were dropped. In some applications, a plurality of non-dropout colors may be chosen, for example, blue and black. Each non-dropout color of interest is stored in memory and is used to evaluate each image pixel against it. Each image pixel is evaluated in a raster fashion and is classified as follows: if the image color matches one of the colors of interest within specified tolerances, i.e. threshold, the output color is set to black, otherwise the output color is set to white. Since only the colors of interest are stored and used, it is not necessary to add information specific to a particular form or image scanned therefore eliminating the need to define many forms or templates used to match patterns against to determine which image elements to retain or eliminate. This is shown schematically in FIG. 5 where a first non-dropout color 50, a second non-dropout color 52, and a threshold 54 is established around these points and image pixels outside the threshold spheres are converted to white, and images inside the threshold spheres are converted to black.

In another embodiment of the invention, if each image pixel is less than the threshold value, it is converted to a first grayscale image rather than being converted to black. If the image pixel is greater than the threshold value, it is converted to a second grayscale image rather than to white. This gives the user the opportunity to select an output which may be in printed form in non-standard format.

The invention has been described with reference to the preferred embodiment thereof, however, it will be appreciated and understood that variations and modifications can be affected within the spirit and scope of the invention as described herein and as defined in the appended claims by a person of ordinary skill in the art without departing from the scope of the invention.

PARTS LIST 10 document
20 document imaging system
22 scanner
24 computer
30 block
32 block
34 block
36 block
38 block
40 block
42 block
44 block
50 first non-dropout color
52 second non-dropout color
54 threshold

What is claimed is:

1. An image processing system for automatic color dropout using Luminance-Chrominance space comprising:

means for scanning a color document and providing a digital image;

means for selecting at least one non-dropout color;

means for transforming said non-dropout color to said Luminance-Chrominance space;

means for transforming each pixel of said scanned image to said Luminance-Chrominance space;

means for computing a distance of each of said image pixels from said non-dropout color;

means for converting each of said image pixels to black if said distance from said non-dropout color is smaller or equal to a threshold value;

means for converting each of said image pixels to white if said distance from said non-dropout color is greater than said threshold value; and means for storing said black and white pixels.

2. An image processing system as in claim 1 wherein said non-dropout color is black.

3. An image processing system as in claim 1 wherein said non-dropout color is blue.

4. An image processing system as in claim 1 wherein two non-dropout colors are selected.

5. An image processing system as in claim 1 wherein an output of said image processing system is processed by an optical character recognition system.

6. An image processing system as in claim 1 wherein said Luminance-Chrominance space is YCbCr.

7. An image processing system as in claim 1 wherein said Luminance-Chrominance space is CIELAB.

8. An image processing system as in claim 1 wherein said digital image is a RGB digital image.

9. A method of processing a color form, said method comprising the steps of:

scanning said color form and producing a red, green and blue digital image;

selecting at least one non-dropout color;

transforming said non-dropout color to a Luminance-Chrominance space;

transforming each pixel of said scanned image from red, green, blue to said Luminance-Chrominance space;

computing a distance of said image pixel from said non-dropout color;

converting said image pixel to black if its distance from said least one non-dropout color is less than or equal to a threshold value; and converting said image pixel to white if its distance from said non-dropout color is greater than said threshold.

10. An image processing system for automatic color dropout using Luminance-Chrominance space comprising:

means for scanning a color document and providing an RGB digital image;

means for selecting at a first non-dropout color and a second non-dropout color;

means for transforming said non-dropout colors to a Luminance-Chrominance space;

means for transforming each pixel of said scanned image from RGB to said Luminance-Chrominance space;

means for computing a first distance of each of said image pixels from said first non-dropout color;

means for computing a second distance of each of said image pixels from said second non-dropout color;

means for converting each of said image pixels to black if said first distance and said second distance is smaller than or equal to a threshold;

means for converting each of said image pixels to white if said first distance or said second distance is greater than said threshold; and means for storing said black and white pixels.

11. An image processing system for automatic color dropout using Luminance-Chrominance space comprising:

means for scanning a color document and providing a digital image;

means for selecting at least one non-dropout color;

means for transforming said non-dropout color to a Luminance-Chrominance space;

means for transforming each pixel of said scanned image to said Luminance-Chrominance space;

means for computing a distance of each of said image pixels from said non-dropout color;

means for converting each of said image pixels to a first grayscale value if said distance from at least one non-dropout color is smaller or equal to a threshold value;

means for converting said image pixel to a second grayscale value if said distance from said non-dropout color is greater than the said threshold; and means for storing said first and second grayscale values as a grayscale image.

12. A method of processing a color form, said method comprising the steps of:

selecting at least one non-dropout color;

transforming said non-dropout color to a Luminance-Chrominance space;

scanning said color form and producing a red, green and blue digital image;

transforming each pixel of said scanned image from red, green, blue to said Luminance-Chrominance space;

computing a distance of said image pixel from said non-dropout color;

converting said image pixel to black if its distance from said least one non-dropout color is less than or equal to a threshold value; and converting said image pixel to white if its distance from said non-dropout color is greater than said threshold.

* * * * *